(12) United States Patent
Soo et al.

(10) Patent No.: US 6,465,909 B1
(45) Date of Patent: Oct. 15, 2002

(54) CIRCUITS AND METHODS FOR CONTROLLING LOAD SHARING BY MULTIPLE POWER SUPPLIES

(75) Inventors: David Henry Soo, Los Altos; Robert Loren Reay, Mountain View, both of CA (US)

(73) Assignee: Linear Technology Corporation, Milpitas, CA (US)

( * ) Notice: Subject to any disclaimer, the term of this patent is extended or adjusted under 35 U.S.C. 154(b) by 63 days.

(21) Appl. No.: 09/628,534

(22) Filed: Jul. 31, 2000

(51) Int. Cl.[7] .................................................. H02J 1/10
(52) U.S. Cl. .............................. 307/52; 307/53; 307/62
(58) Field of Search ................................. 307/24, 52–63

(56) References Cited

U.S. PATENT DOCUMENTS

| 4,318,007 | A | * | 3/1982 | Rizzi | 307/57 |
| 5,157,269 | A | * | 10/1992 | Jordan et al. | 307/59 |
| 6,166,455 | A | * | 12/2000 | Li | 307/52 |
| 6,215,290 | B1 | * | 4/2001 | Yang et al. | 323/282 |
| 6,236,582 | B1 | * | 5/2001 | Jalaleddine | 363/72 |

FOREIGN PATENT DOCUMENTS

| DE | 38 04 074 C2 | 8/1989 |
| EP | 0 402 367 B1 | 5/1993 |

OTHER PUBLICATIONS

English translation of European Patent No. 0 402 367, May 12, 1993.
English translation of claims of German Patent No. 38 04 074, Aug. 24, 1989.
Linear Technology Data Sheet, "LT1579: 300mA Dual Input Smart Battery Backup Regulator", New Products Catalog and Selection Guides, 1–29, Spring/Summer 1998.
Linear Technology Data Sheet, "LT1326: 2.5 Micropower Precision Triple Supply Monitor", New Products Catalog and Selection Guides, 1–32, Spring/Summer 1998.

* cited by examiner

*Primary Examiner*—Fritz Fleming
(74) *Attorney, Agent, or Firm*—Fish & Neave; Robert W. Morris; Jeffrey D. Mullen

(57) ABSTRACT

Circuits and methods for controlling load sharing by multiple power supplies are provided. In preferred embodiments, load share controllers utilize multiple voltage control loops to monitor the output voltages that are being provided by multiple power supplies connected to a load. These voltage control loops each generate a voltage control voltage that is proportional to the difference between the actual output voltage of the corresponding power supply and the desired output voltage. The voltage control loop with the highest voltage control voltage then controls a current control voltage generated in a current control loop for each power supply via a share bus. These current control loops then regulate the current provided by the corresponding power supplies so that those currents are all proportional to the voltage on the share bus. By monitoring the current control voltage in each current control loop, the voltage at the output of each power supply, and the direction of the current flowing between each power supply and the load, the circuits and methods of preferred embodiments of the invention can detect and account for out-of-regulation conditions, over voltage conditions, short circuit conditions, and hot-swapping conditions.

28 Claims, 4 Drawing Sheets

CIRCUITS AND METHODS FOR CONTROLLING LOAD SHARING BY MULTIPLE POWER SUPPLIES

BACKGROUND OF THE INVENTION

The present invention relates to circuits and methods for controlling load sharing by multiple power supplies. More particularly the present invention relates to circuits and methods for controlling load sharing by multiple power supplies that use a voltage loop that monitors a current loop and that provide detection and hot-swapping capabilities.

When using multiple power supplies to supply power to a load, it is frequently desirable and necessary to split the power provided to the load evenly among the multiple power supplies. One way in which this is done is through the use of load share controllers which monitor the output current of each power supply. In these controllers, load sharing is achieved by determining which power supply is providing the highest amount of current and increasing the current provided by the remaining power supplies to just under that amount.

Although such known load share controllers provide the ability to split a load evenly among multiple power supplies, these controllers suffer from various inadequacies. For example, these power supplies exhibit low frequency ripple that is caused by controlling load sharing based only upon the current output of the supplies. As another example, such power supplies can experience catastrophic failure conditions when the current provided by one power supply increases out of regulation and the remaining power supplies attempt to match that current.

Thus, it is an object of the present invention to provide load share controllers that provide improved load sharing performance, fault detection, and hot-swapping capabilities.

SUMMARY OF THE INVENTION

In accordance with this and other objects of the invention, circuits and methods for controlling load sharing by multiple power supplies are provided. In preferred embodiments of the invention, load share controllers utilize multiple voltage control loops to monitor the output voltages that are being provided by multiple power supplies connected to a load. These voltage control loops each generate a voltage control voltage that is proportional to the difference between the actual output voltage of the corresponding power supply and the desired output voltage. The voltage control loop with the highest voltage control voltage then controls a current control voltage generated in a current control loop for each power supply via a share bus. These current control loops then regulate the current provided by the corresponding power supplies so that those currents are all proportional to the voltage on the share bus.

By monitoring the current control voltage in each current control loop, the voltage at the output of each power supply, and the direction of the current flowing between each power supply and the load, the circuits and methods of preferred embodiments of the invention can detect and account for out-of-regulation conditions, over voltage conditions, short circuit conditions, and hot-swapping conditions. In the event of these conditions, the preferred embodiments of the invention provide an indication of the condition at a status pin and attempt to minimize the harmful effects that may be created.

BRIEF DESCRIPTION OF THE DRAWINGS

Further features of the invention, its nature and various advantages will become more apparent from the following detailed description of the invention, taken in A conjunction with the accompanying drawings, in which like reference characters refer to like parts throughout, and in which.

DETAILED DESCRIPTION OF THE INVENTION

Figure 1:
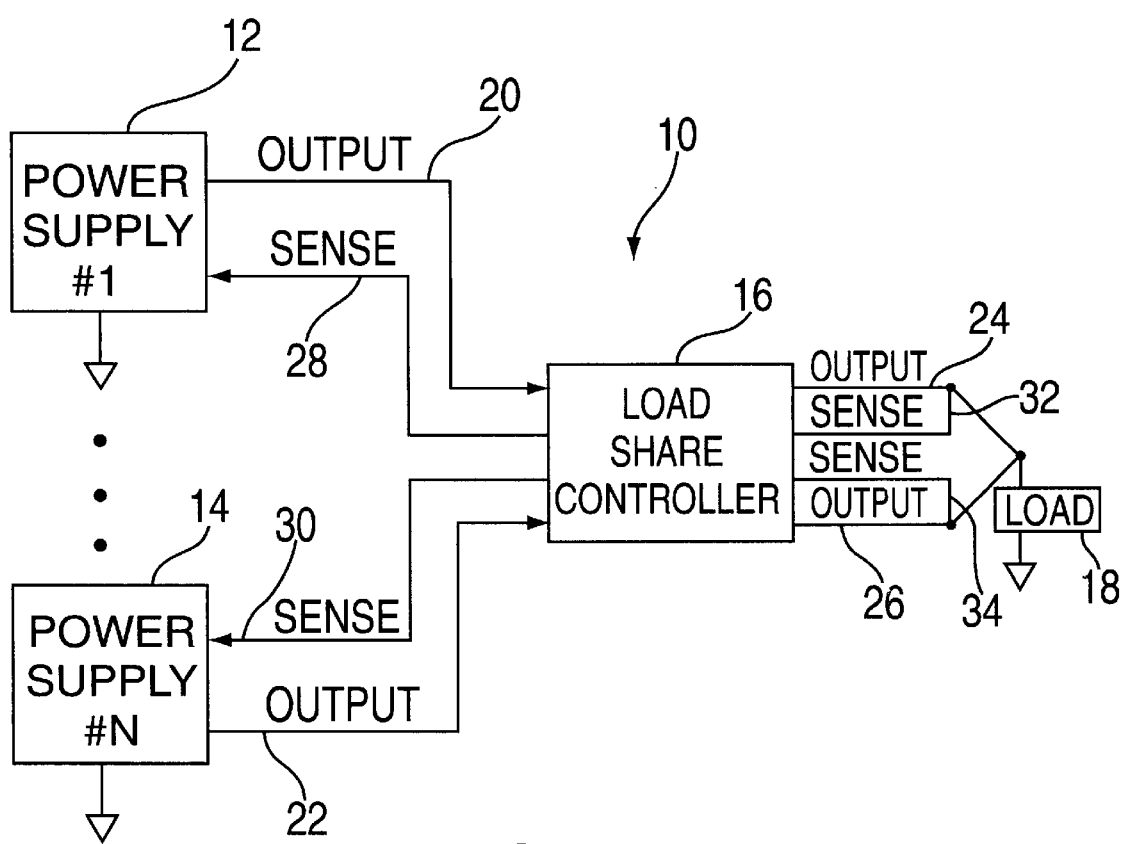
FIG. 1 is a simplified schematic diagram of a load share controller connected to two power supplies and a load in accordance with one embodiment of the present invention.

The invention is now described in more detail in connection with FIGS. 1–4. Turning first to FIG. 1, a block diagram of a circuit 10 comprising multiple power supplies 12 and 14 which provide power to a load 18 through a load share controller 16 is illustrated. As shown, each of power supplies 12 and 14 provides power to load share controller 16 via output connections 20 and 22. Load share controller 16 then provides this power to load 18 via output connections 24 and 26. In order to properly account for voltage drop in output connections 20, 22, 24, and 26, sense connections 28, 30, 32, and 34 are also provided between power supplies 12 and 14, load share controller 16, and load 18. As illustrated, sense connections 32 and 34 are connected to output connections 24 and 26, respectively, just prior to the point where connections 24 and 26 are connected to load 18. In this way, sense connections 32 and 34 can most accurately measure voltage drops between power supplies 12 and 14 and load 18. As will be shown in detail below, load share controller 16 may use sense connections 28 and 30 to control power supplies 12 and 14 so that these supplies provide the desired amounts of power to load 18.

Although only a single load share controller 16 that controls multiple power supplies is illustrated in FIG. 1, load share controllers in accordance with the present invention may also be physically implemented as multiple devices that each control a single power supply and that communicate with each other in order to coordinate control of multiple power supplies.

Figure 2:
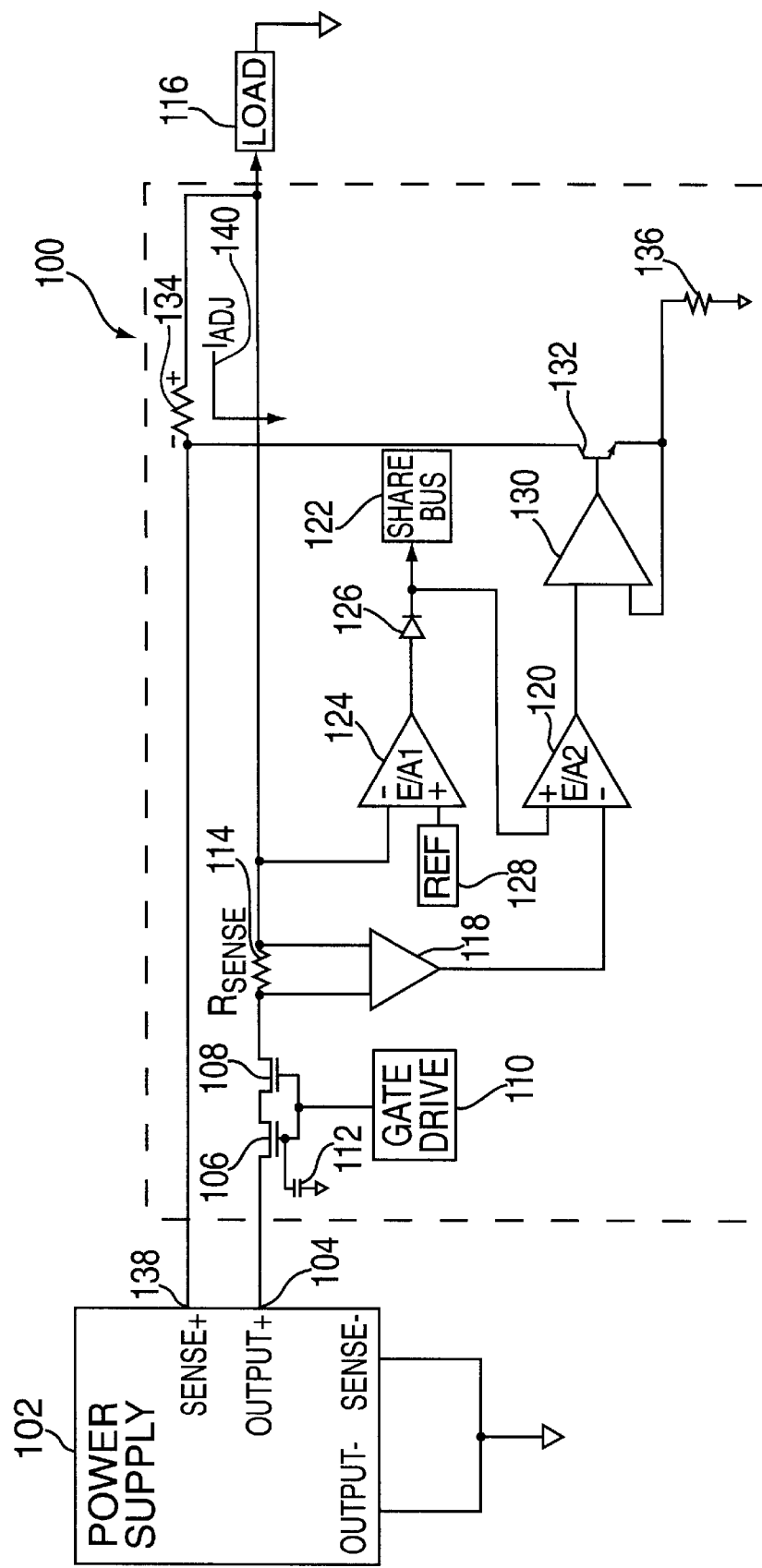
FIG. 2 is a simplified schematic diagram of a portion of a load share controller connected to a power supply and a load in accordance with one embodiment of the present invention.

Referring now to FIG. 2, a simplified block diagram of a circuit 100 that represents a portion of load share controller 16 (FIG. 1) which is connected to a power supply 102 in accordance with one embodiment of the present invention is shown. As illustrated, circuit 100 receives current from power supply 102 through output+ connection 104. Within circuit 100, this current is provided to series-connected field effect transistors (FETs) 106 and 108. Normally, FETs 106 and 108 are driven ON by gate driver 110 which is connected to the gates of FETs 106 and 108. Also connected to the gates of FETs 106 and 108 is a capacitor 112. After the current passes through FETs 106 and 108, the current passes through a sense resistor 114. Resistor 114 is preferably selected for making accurate current measurements while having a low voltage drop (and thus is a highly accurate, low resistance resistor). Once the current passes through resistor 114, this current is then provided to a load 116 that is connected to circuit 100.

In order to measure the current being provided by power supply 102, circuit 100 includes an amplifier 118 that has an input on each side of resistor 114 and that amplifies the voltage drop across resistor 114. Amplifier 118 then provides a voltage that is proportional to the current in resistor 114 to an error amplifier 120. Error amplifier 120 also receives a voltage from a share bus 122. Share bus 122 may receive this voltage from error amplifier 124 by way of diode 126 or may receive this voltage from similar components of another circuit performing the same function as circuit 100. The voltage provided by error amplifier 124 is proportional to the difference between a reference voltage 128 connected to error amplifier 124 and the voltage provided by power supply 102 at load 116. In order to prevent components that are similar to error amplifier 124 and that are in circuits which perform the same function as circuit 100 from conflicting with error amplifier 124 via share bus 122, diode 126 is provided to allow the highest of error amplifier 124 and such components to control share bus 122.

Based upon the voltages provided at the inputs of error amplifier 120, the amplifier then provides a voltage that is proportional to the difference between these voltages to amplifier 130. Using this voltage, amplifier 130 drives transistor 132 so that current $I_{ADJ}$ 140 passes from the current provided to load 116 through resistor 134, transistor 132, and resistor 136. By varying the current passed in this way, a variable voltage drop is produced across resistor 134 which is connected to the sense+ connection 138 of power supply 102. This variable voltage drop at sense+ connection 138 of power supply 102 causes the voltage at output+ connection 104 of power supply 102 to also vary. In this way, the power provided to load 116 by power supply 102 is thus controlled.

Through the configuration of circuit 100 shown in FIG. 2, this circuit can control the voltage and the current that are supplied by power supply 102 so that the voltage matches a desired reference voltage 128. This is accomplished by first generating a proportional voltage control voltage using error amplifier 124 whenever the supplied voltage doesn't match the reference voltage. If this voltage control voltage exceeds a voltage being produced by another circuit connected to share bus 122, then the voltage control voltage will be provided through diode 126 to error amplifier 120. Error amplifier 120 will then produce a current control voltage that is proportional to the difference between the voltage control voltage and a voltage that is proportional to the current being provided to load 116 (i.e., the voltage provided by amplifier 118). This current control voltage will then be amplified by amplifier 130 to drive transistor 132 and consequently control sense+ connection 138 of power supply 102. By controlling sense+ connection 138 of power supply 102, the voltage and the current that are supplied by power supply 102 are then maintained at the desired level.

For example, if the voltage at load 116 was increased as compared to reference 128, a correspondingly decreased voltage control voltage would be produced by error amplifier 124 and fed to error amplifier 120 through diode 126. This decreased voltage control voltage would then be compared by error amplifier 120 to the current being provided to load 116, and a correspondingly decreased current control voltage would be fed to amplifier 130. Amplifier 130 would then proportionally decrease the drive being applied to transistor 132 so that a decreased voltage drop is created across resistor 140. This decreased voltage drop would cause an increased voltage on sense+ connection 138 at power supply 102. The increased voltage on sense+ connection 138 at power supply 102 would then cause the voltage and the current provided to load 116 by power supply 102 to be decreased.

Figure 3:
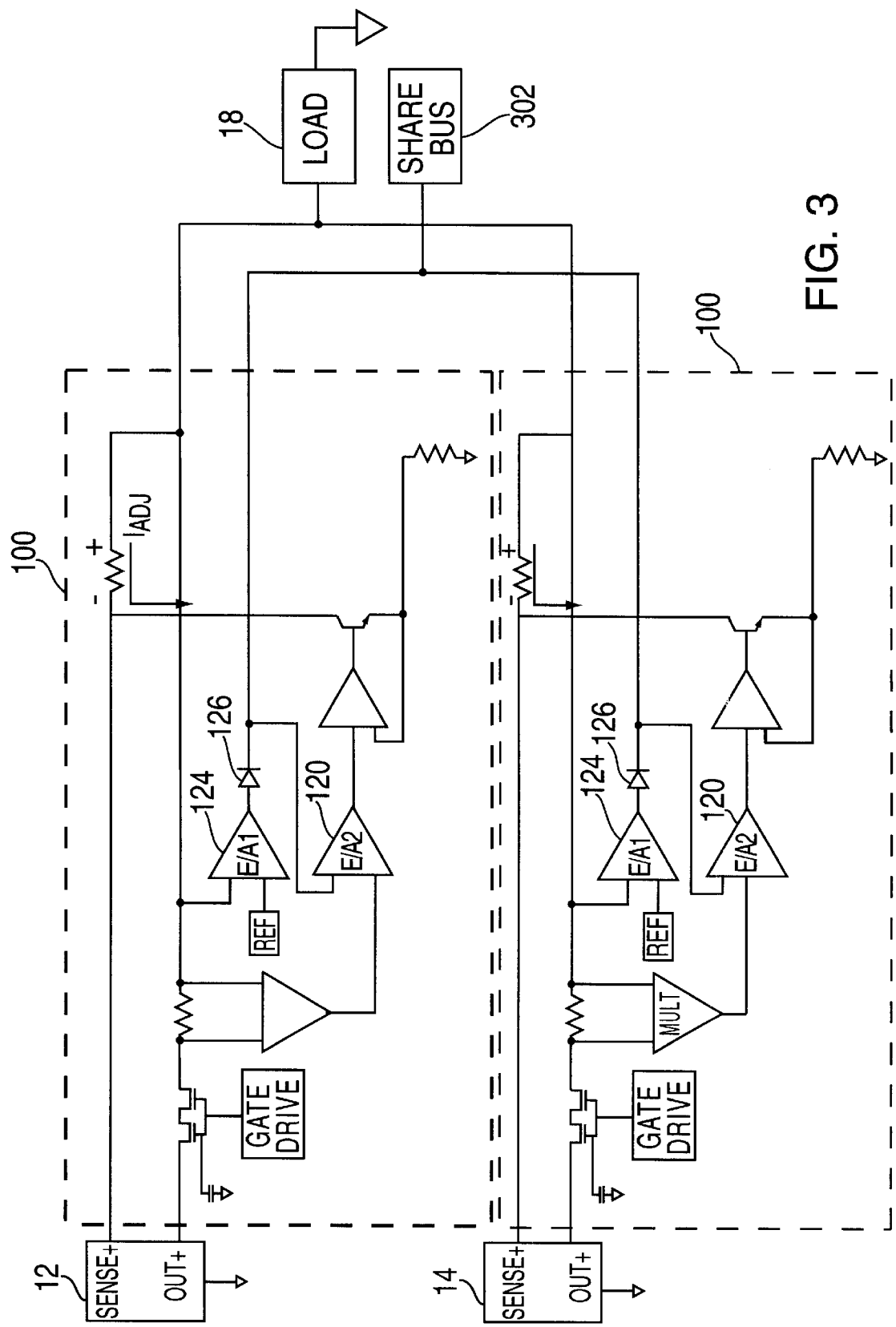
FIG. 3 is a simplified schematic diagram of two portions of a load share controller, each connected to a separate power supply and a common load, in accordance with one embodiment of the present invention.

Turning to FIG. 3, an example of two circuits 100 that are connected to power supplies 12 and 14 and to a load 18 in accordance with the present invention is illustrated. Circuits 100 in this figure are substantially the same as circuit 100 shown in FIG. 2. In this arrangement, circuits 100 may be implemented as separate circuits, as separate devices (e.g., integrated circuits), as a single circuit, or as a single device (e.g., a single integrated circuit). When operating, circuits 100 of FIG. 3 operate substantially similar to circuit 100 of FIG. 2. Because the voltage control voltages produces by error amplifiers 124 are provided to share bus 302 via diodes 126, only the larger of these voltage control voltages is present on bus 302 at any give time. The voltage control voltage that is on bus 302 controls both error amplifiers 120, and thus each of circuits 100 provide an equal share of the power provided to load 18.

Figure 4:
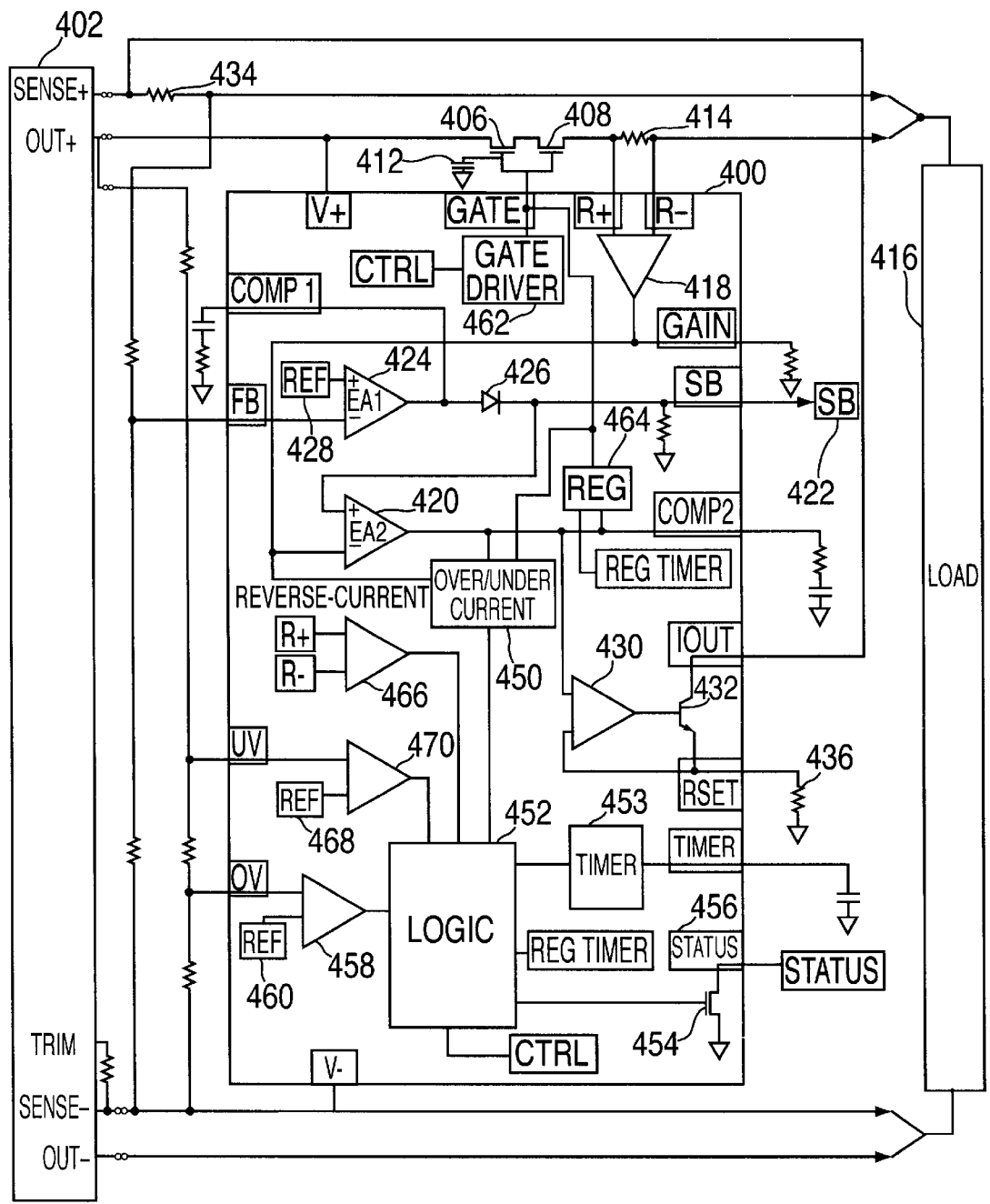
FIG. 4 is a more detailed schematic diagram of a portion of a load share controller connected to a power supply and a load in accordance with one embodiment of the present invention.

Referring to FIG. 4, an embodiment of a load share controller module 400 with fault detection features in accordance with the present invention is illustrated. As shown, module 400 is connected to a power supply 402 and a load 416. Within FIG. 4, the components identified by reference numerals 406, 408, 412, 414, 418, 420, 422, 424, 426, 428, 430, 432, 434, and 436 operate substantially the same as the corresponding components 106, 108, 112, 114, 118, 120, 122, 124, 126, 128, 130, 132, 134, and 136, respectively, as shown in and described in connection with FIG. 2.

One fault detection feature provided by module 400 in accordance with the present invention is detection of a loss of regulation in power supply 402. Loss of regulation may be detected in module 400 using an over/under current circuit 450 that monitors whether power supply 402 is operating outside of a given range of the target power supply output (i.e., when power supply 402 is in an over/under current condition). Using circuit 450, this determination is made by checking the output of error amplifier 420 for a current control voltage that is either too high or too low. Once an over/under current condition has been detected, circuit 450 causes logic 452 and FET 454 to indicate a fault condition by pulling down status pin 456. After the condition is cured, over/under circuit 450 causes status pin 456 to be released.

Because brief and infrequent loads may cause power supply 402 to operate outside this range without an actual power supply fault being present, over/under current circuit 450 preferably uses a timer 453 that is connected to logic 452 in order to suspend indication of an over/under current condition until the condition has been present for a given period of time. Similarly, circuit 450 also suspends over/under current condition detection when current to load 416 is below a given threshold as measured at the output of amplifier 418, and when the voltage at the gate of FETs 406 and 408 is too low.

Another fault detection feature provided by module 400 in accordance with the present invention is detection of over voltage outputs from power supply 402. In the event that the output of power supply 402 is determined by comparator 458 to have exceeded reference voltage 460, comparator 458 and logic 452 will trigger a fault indication on status pin 456 until the condition is cured and cause gate driver 462 to pull down the gates of FETs 406 and 408. Once the current provided to load 416 by power supply 402 has dropped to nearly zero, the gates of FETs 406 and 408 will be released and capacitor 412 will be charged by a 10 uA current source in gate driver 462. Upon the current provided to load 416 by power supply 402 approaching the correct value, regulator 464 will then regulate the voltage at the gates of FETs 406 and 408 based upon the output of error amplifier 420 so that this correct current value is maintained. Because FETs 406 and 408 can operate in this partially enhanced state for only a limited period of time prior to burning out, logic 452 and timer 453 limit the time during which regulator 464 regulates the gate voltages of FETs 406 and 408. Once the time limit for regulation has been exceeded, FETs 406 and 408 are turned OFF by gate driver 462 until power supply 402 is disconnected.

Yet another fault detection feature provided by module 400 in accordance with the present invention is detection of under voltage conditions in the output of power supply 402. Such conditions may be caused by short circuits in the output of power supply 402 and by hot-swapping of power supply 402. In the event that the short circuit in the output of power supply 402 is a soft or resistive short, a reverse current flow may take place through sense resistor 414. If this reverse current flow is longer than 10 uS in length, comparator 466 will detect the reverse current flow and logic 452 will cause gate driver 462 to pull down the gates of FETs 406 and 408. Once the voltage at the output of power supply 402 has dropped below reference voltage 468 as measured by comparator 470, logic 452 will cause a fault to be indicated on status pin 456. In the event that the short circuit in the output of power supply 402 is a hard short, the voltage at the output of power supply 402 will drop rapidly below reference voltage 468 as measured by comparator 470. When this happens, comparator 470 and logic 452 will cause gate driver 462 to pull down the gates of FETs 406 and 408 and a fault to be indicated on status pin 456.

In the event that an under voltage condition at the output of power supply 402 is caused by hot-swapping of the power supply, module 400 will cause FETs 406 and 408 to turn off because of the low voltage condition on the output of the power supply as measured by comparator 470 after the power supply is disconnected from comparator 470 (or upon a previously off power supply being connected to comparator 470). Upon power being restored at the output of power supply 402, and thus comparator 470, logic 452 and timer 453 will start a timing cycle. Once the timing cycle has completed, logic 452 will cause gate driver 462 to charge capacitor 412 using a 10 uA current source so that the gates of FETs 406 and 408 ramp up slowly until the gates are fully ON and normal operation is resumed. In this way, load 416 is isolated from power supply 402 until the power supply has had time to reach normal operating condition.

Those skilled in the art will appreciate that the present invention can be practiced by other than the described embodiments, which are presented for purposes of illustration and not of limitation, and the present invention is limited only by the claims.

What is claimed is:

1. A circuit for controlling load sharing by a plurality of power supplies that are providing power to a load, comprising:
   a first error amplifier that measures an output voltage provided by one of the plurality of power supplies to the load;
   a diode that is couple to the output of the first error amplifier and that provides a voltage control voltage that is proportional to the output voltage of the one of the plurality of power supplies on a share bus;
   an amplifier that measures an output current provided by the one of the plurality of power supplies to the load;
   a second error amplifier that provides a feedback signal to the one of the plurality of power supplies based upon a comparison of the voltage control voltage and the output current.

2. The circuit of claim 1, further comprising a status output that indicates when the one of the plurality of power supplies is operating outside of a given range.

3. The circuit of claim 2, further comprising a timer that suspends indication of when the one of the plurality of power supplies is operating outside of the given range until the one of the power supplies has been operating outside of the given range for a given period of time.

4. The circuit of claim 2, further comprising a logic circuit that suspends indication of when the one of the plurality of power supplies is operating outside of the given range when the one of the power supplies is providing current below a given level.

5. The circuit of claim 1, further comprising:
   a comparator that detects when the output voltage of the one of the plurality of power supplies exceeds a given voltage;
   a gate driver that causes the output current provided by the one of the plurality of power supplies to be reduced, and, once the output current provided by the one of the plurality of power supplies has dropped below a given level, causes the output current provided to increase to a desired level; and
   a regulator that regulates the output voltage provided by the one of the plurality of power supplies at the desired level.

6. The circuit of claim 5, further comprising a timer that shuts down current flow from the one of the plurality of power supplies to the load after the output voltage provided by the one of the plurality of power supplies has been regulated for a given period of time.

7. The circuit of claim 5, further comprising a status output that indicates a fault condition upon detecting when the output voltage of the one of the plurality of power supplies exceeds the given voltage.

8. The circuit of claim 1, further comprising:
   a comparator that detects a reverse current flow into one of the plurality of power supplies; and
   a logic circuit that isolates the one of the plurality of power supplies after the reverse current flow has been detected.

9. The circuit of claim 8, further comprising a timer that confirms that the reverse current flow is present for a given period of time before isolating the one of the plurality of power supplies.

10. The circuit of claim 8, further comprising a status output that indicates a fault when the output voltage of the one of the power supplies drops below a given voltage.

11. The circuit of claim 1, further comprising:
    a comparator that detects when the output voltage of one of the plurality of power supplies has fallen below a given level; and
    a logic circuit that isolates the one of the plurality of power supplies after detecting that the one of the plurality of power supplies has fallen below the given level.

12. The circuit of claim 11, further comprising a status output that indicates a fault when the output voltage of the one of the power supplies drops below the given level.

13. The circuit of claim 11, further comprising a timer that prevents the one of the plurality of power supplies from providing power to the load for a given period of time after the output voltage of the one of the plurality of power supplies has been restored.

14. The circuit of claim 11, further comprising a gate driver that ramps up current provided from the one of the plurality of power supplies to the load after the output voltage of the one of the plurality of power supplies has been restored.

15. A method for controlling load sharing by a plurality of power supplies that are providing power to a load, comprising:

measuring an output voltage provided by one of the plurality of power supplies to the load;

providing a voltage control voltage that is proportional to the output voltage of the one of the plurality of power supplies on a share bus;

measuring an output current provided by the one of the plurality of power supplies to the load;

providing a feedback signal to the one of the plurality of power supplies based upon a comparison of the voltage control voltage and the output current.

16. The method of claim 15, further comprising indicating when the one of the plurality of power supplies is operating outside of a given range.

17. The method of claim 16, further comprising suspending indication of when the one of the plurality of power supplies is operating outside of the given range until the one of the power supplies has been operating outside of the given range for a given period of time.

18. The method of claim 16, further comprising suspending indication of when the one of the plurality of power supplies is operating outside of the given range when the one of the power supplies is providing current below a given level.

19. The method of claim 15, further comprising:

detecting when the output voltage of the one of the plurality of power supplies exceeds a given voltage;

causing the output current provided by the one of the plurality of power supplies to be reduced;

once the output current provided by the one of the plurality of power supplies has dropped below a given level, allowing the output current provided to increase to a desired level; and regulating the output voltage provided by the one of the plurality of power supplies at the desired level.

20. The method of claim 19, further comprising shutting down current flow from the one of the plurality of power supplies to the load after the output voltage provided by the one of the plurality of power supplies has been regulated for a given period of time.

21. The method of claim 19, further comprising indicating a fault condition upon detecting when the output voltage of the one of the plurality of power supplies exceeds the given voltage.

22. The method of claim 15, further comprising:

detecting a reverse current flow into the one of the plurality of power supplies; and isolating the one of the plurality of power supplies after the reverse current flow has been detected.

23. The method of claim 22, further comprising confirming that the reverse current flow is present for a given period of time before isolating the one of the plurality of power supplies.

24. The method of claim 22, further comprising indicating a fault when the output voltage of the one of the power supplies drops below a given voltage.

25. The method of claim 15, further comprising:

detecting when the output voltage of the one of the plurality of power supplies has fallen below a given level; and isolating the one of the plurality of power supplies after detecting that the one of the plurality of power supplies has fallen below the given level.

26. The method of claim 25, further comprising indicating a fault when the output voltage of the one of the power supplies drops below the given level.

27. The method of claim 25, further comprising preventing the one of the plurality of power supplies from providing power to the load for a given period of time after the output voltage of the one of the plurality of power supplies has been restored.

28. The method of claim 25, further comprising ramping up current provided from the one of the plurality of power supplies to the load after the output voltage of the one of the plurality of power supplies has been restored.

* * * * *

UNITED STATES PATENT AND TRADEMARK OFFICE
CERTIFICATE OF CORRECTION

PATENT NO.    : 6,465,909 B1
DATED         : October 15, 2002
INVENTOR(S)   : David Henry Soo et al.

It is certified that error appears in the above-identified patent and that said Letters Patent is hereby corrected as shown below:

Column 5,
Line 58, change "couple" to -- coupled --.
Line 63, change "load;" to -- load; and --.

Column 7,
Line 14, change "load;" to -- load; and --.

Signed and Sealed this

Twenty-fifth Day of February, 2003

JAMES E. ROGAN
*Director of the United States Patent and Trademark Office*